United States Patent
Heine

(10) Patent No.: US 9,725,068 B2
(45) Date of Patent: Aug. 8, 2017

(54) SELF-LOCKING BELT RETRACTOR WITH DEACTIVATION OF ITS BELT WEBBING-SENSITIVE CONTROL SYSTEM OPERATING IN THE RETRACTING DIRECTION OF THE BELT SHAFT

(71) Applicant: Autoliv Develpement AB, Vargarda (SE)

(72) Inventor: Volkmar Heine, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 103 days.

(21) Appl. No.: 14/369,461

(22) PCT Filed: Dec. 18, 2012

(86) PCT No.: PCT/EP2012/075958
§ 371 (c)(1),
(2) Date: Jun. 27, 2014

(87) PCT Pub. No.: WO2013/098124
PCT Pub. Date: Jul. 4, 2013

(65) Prior Publication Data
US 2015/0001328 A1 Jan. 1, 2015

(30) Foreign Application Priority Data
Dec. 27, 2011 (DE) .......................... 10 2011 057 066

(51) Int. Cl.
*B60R 22/38* (2006.01)
(52) U.S. Cl.
CPC .................................... *B60R 22/38* (2013.01)
(58) Field of Classification Search
CPC .............................. B60R 22/38; B60R 22/405
(Continued)

(56) References Cited
U.S. PATENT DOCUMENTS 3,851,835 A * 12/1974 Fohl ........................ B60R 22/38
242/383.3
5,388,780 A * 2/1995 Matsuki .................. B60R 22/41
242/383.1
(Continued)

FOREIGN PATENT DOCUMENTS
DE 2 020 315 4/1970
DE 29 24 575 2/1981
(Continued)

OTHER PUBLICATIONS
PCT International Search Report—Aug. 21, 2013.
German Examination Report—Dec. 3, 2012.

*Primary Examiner* — Sang Kim
(74) *Attorney, Agent, or Firm* — Brinks Gilson & Lione

(57) ABSTRACT

A self-locking belt retractor for seat belts having a belt shaft rotatably mounted in a housing frame and having a belt-webbing-sensitive actuation mechanism A control plate that can be deflected with a relative rotation between the belt shaft and the control plate The control plate bears a two-arm eccentrically mounted inertial mass A control clip is rotatably frictionally mounted on a bearing surface for the belt shaft. An actuator of the control plate engages two legs of control clip and forms contact surfaces for the legs for shifting the control plate in belt retracting direction as well as in belt extending direction. One of the legs projects during rotation of the control plate in the belt retracting direction into the pivoting path of a pivot arm of the inertial mass and releases the inertial mass with a rotation of the control plate in the belt extending direction.

16 Claims, 2 Drawing Sheets

Figure 1:
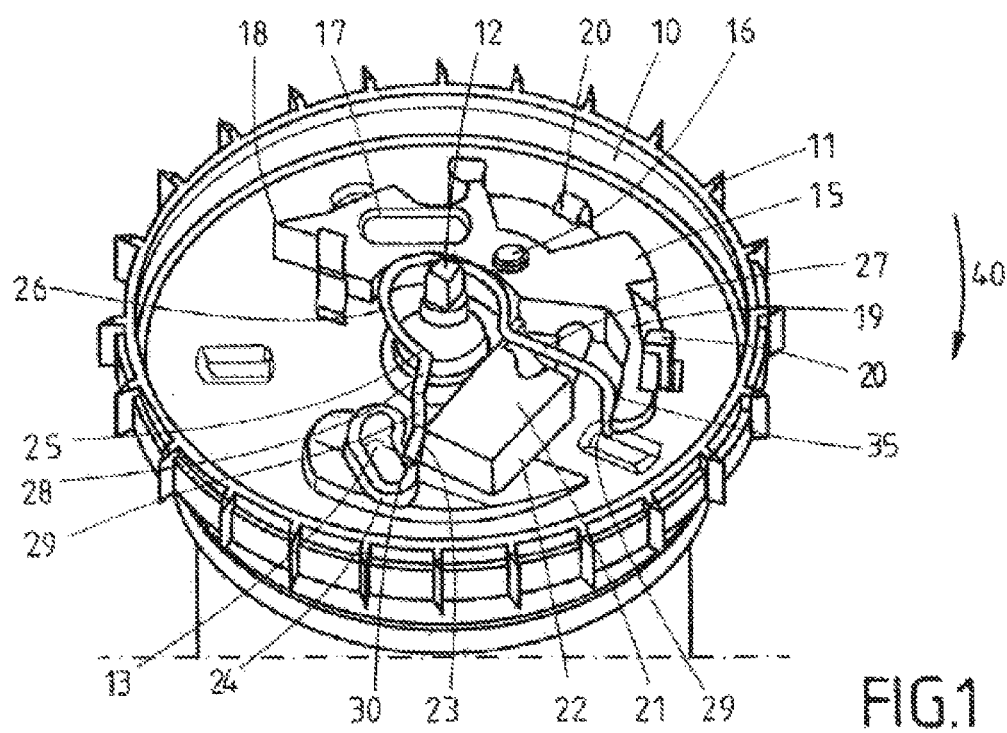

(58) Field of Classification Search
USPC .................................................. 242/382.1
See application file for complete search history.

(56) References Cited

U.S. PATENT DOCUMENTS

| | | | | | |
|---|---|---|---|---|---|
| 7,635,103 | B2* | 12/2009 | Kim | ........................ | B60R 22/41 242/379.1 |
| 7,681,824 | B2* | 3/2010 | Mori | ..................... | B60R 22/405 242/382.1 |
| 7,770,836 | B2* | 8/2010 | Bok | ........................ | B60R 22/41 242/383 |
| 8,118,249 | B2* | 2/2012 | Aihara | .................... | B60R 22/41 242/383.1 |
| 8,608,101 | B2* | 12/2013 | Choi | ....................... | B60R 22/38 242/382 |
| 2005/0224623 | A1* | 10/2005 | Sumiyashiki | ........... | B60R 22/41 242/384.2 |
| 2007/0290091 | A1* | 12/2007 | Mori | ..................... | B60R 22/405 242/383.1 |
| 2009/0218432 | A1* | 9/2009 | Aihara | .................... | B60R 22/41 242/396.2 |
| 2011/0127363 | A1* | 6/2011 | Tatsuma | ................ | B60R 22/405 242/383.2 |
| 2014/0042256 | A1* | 2/2014 | Yamada | .................. | B60R 22/38 242/382.1 |
| 2014/0353416 | A1* | 12/2014 | Heine | ..................... | B60R 22/38 242/383 |
| 2015/0360642 | A1* | 12/2015 | Lee | ....................... | B60R 22/405 242/383.2 |

FOREIGN PATENT DOCUMENTS

| | | | | |
|---|---|---|---|---|
| DE | 39 26 370 | A1 | 2/1990 | |
| DE | 103 24 195 | A1 | 1/2005 | |
| DE | 10 2008 053 853 | A1 | 7/2009 | |
| EP | 1 860 002 | A1 | 11/2007 | |
| GB | 2 099 287 | A | 12/1982 | |
| GB | 2 269 308 | A | 2/1994 | |
| GB | 2 294 384 | A | 5/1996 | |
| WO | WO 2004106125 | A1 * | 9/2004 | ........... B60R 22/405 |
| WO | WO 2009/049754 | A1 | 4/2009 | |

* cited by examiner

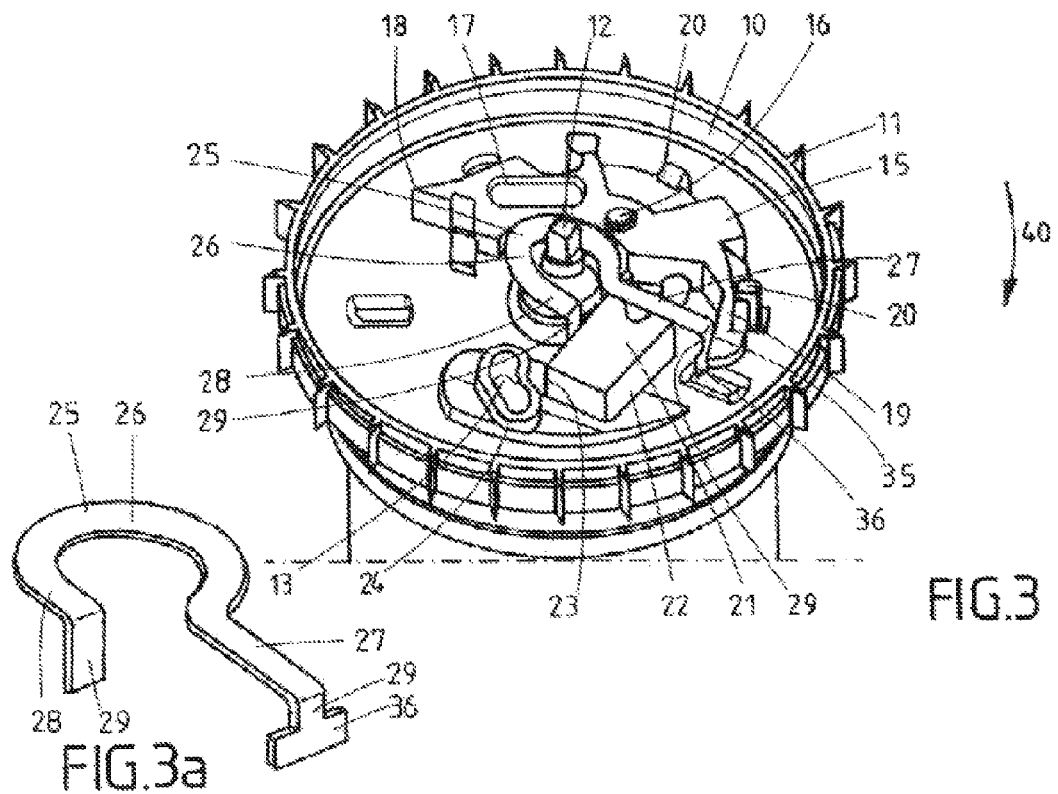
FIG.3
FIG.3a
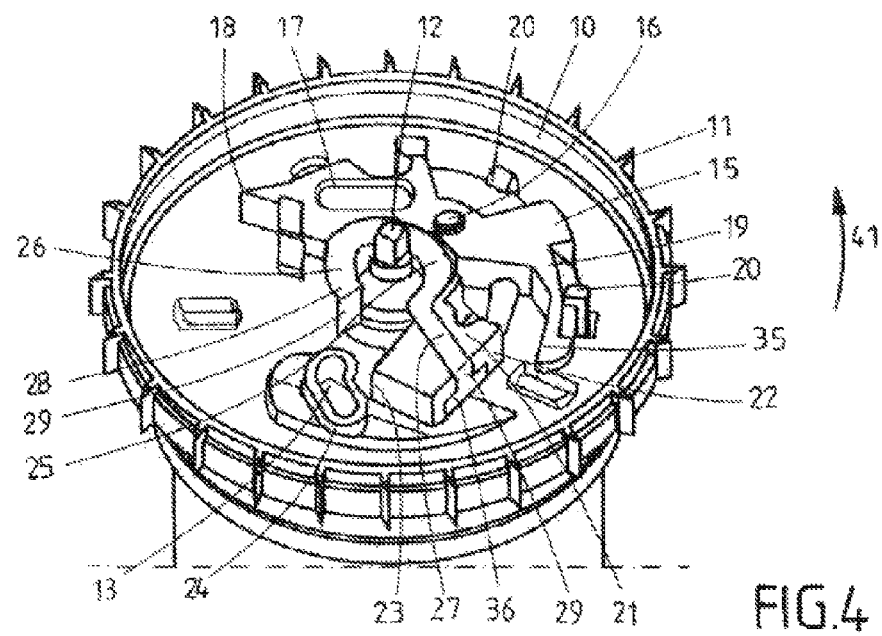
FIG.4

SELF-LOCKING BELT RETRACTOR WITH DEACTIVATION OF ITS BELT WEBBING-SENSITIVE CONTROL SYSTEM OPERATING IN THE RETRACTING DIRECTION OF THE BELT SHAFT

CROSS REFERENCE TO RELATED APPLICATIONS

This application claims priority to German Patent Application No. 10 2011 057 066.7, filed Dec. 27, 2011 and PCT/EP2012/075958, filed Dec. 18, 2012.

FIELD OF THE INVENTION

The invention concerns a self-locking belt retractor for seat belts having a belt shaft rotatably mounted in a housing frame and pretensioned by means of a retraction spring in the retracting direction of the belt webbing and a belt-webbing-sensitive actuation mechanism, which has a control plate coupled to the belt shaft for deflecting a locking element arranged on the belt spool that can be deflected against spring action with a relative rotation between the belt shaft and the control plate until it engages with a housing gearing. The control plate bears a two-arm inertial mass, which is eccentrically pivotably mounted on the control plate and can be radially deflected against the action of a reset spring, and which, in case of release as a result of the angular acceleration acting on the control plate, radially pivots with its one blocking arm until it engages in a fixed gearing and in this way stops and fixes the control plate in its rotating motion. A spring-like control clip is provided having two legs arranged at a distance from each other in peripheral direction are rotatably mounted on a bearing surface for the belt shaft and/or the control plate by means of a frictionally engaged bearing relative to the control plate between an abutting position on the inertial mass and an abutting position on an actuator rising up from the plane of the control plate.

BACKGROUND

A belt retractor with the aforementioned features is described in EP 1 860 002 A1. In such a belt retractor provided with a belt-webbing-sensitive activation mechanism there can arise the problem, for example, when the belt shaft rotates with such rotational speed in the retracting direction after the seat belt is removed that the belt shaft springs back due to the inertia in the extending direction as a result of the stop of the rotating motion effective at the end of the belt webbing retraction. As a result of the rotation in the direction of belt webbing extension of the belt shaft caused thereby, the belt-webbing-sensitive control system is activated also with a relatively minor angular acceleration, that is, the inertial mass is pivoted into its engaged position with the fixed gearing. The same can occur if the belt webbing retraction is interrupted by a sudden deceleration of the vehicle. This behavior of the belt retractor can have the result that the belt retractor must first be unlocked for further use by pulling on the belt webbing, in order to unlock the control system and subsequently freely pull out the belt. Another problem occurs when the webbing-sensitive control system responds to small vibrations when the seatbelt is unlatched, giving rise to on it desirable rattle noise generation.

In the generic belt retractor described in EP 1 860 002 A1 it is proposed to eliminate this problem by the arrangement of a frictionally engaging torsion spring thus positioned relative to the control plate on a bearing surface for the belt shaft and/or the control plate, with said spring having an Ω shape with a central bearing area provided with radius and spring legs projecting laterally therefrom in opposite directions and extending at an angle of 180 degrees from each other. The one spring leg coacts at the same time with one end of the inertial mass, while the other spring leg is in contact with an actuator that rises up from the plane of the control plate. The frictionally engaged rotation of the torsion spring on its bearing surface that goes along with the different operating states of the belt retractor is produced, on the one hand, by means of the inertial torque of the torsion spring and the inertial torque acting on it and, on the other hand, by means of the interaction with the inertia-controlled motion of the inertial mass. This can lead in a disadvantageous way to control problems in the interactions of the torsion spring with the inertial mass.

It is therefore an object of the invention to further develop a self-locking belt retractor with the generic features in such a way that its operating sequence is improved.

SUMMARY AND INTRODUCTORY DESCRIPTION OF THE INVENTION

This object is attained by the device as disclosed in this description, by means of advantageous embodiments and further developments of the invention.

A feature of the invention provides that both legs of the control clip enclose the actuator between them and the actuator configures contact surfaces for the clip legs for taking along the clip during the rotation of the control plate in the belt retracting direction as well as the belt extending direction. One of the two clip legs projects during rotation of the control plate in the belt retracting direction into the pivoting path of a pivot arm of the inertial mass located opposite to the blocking arm in the case of a release and prevents a pivoting out of the inertial mass in this blocking position of the torsion spring and releases the inertial mass with a rotation of the control plate in the belt extending direction as a result of a relative rotation of the torsion spring with respect to the control plate in a release position of the control clip.

The invention is thus based on the basic principle of restricting the inertial mass from pivoting out independently from the inertial torque acting thereon by means of the provided control clip. Since an activation of the inertial mass with its pivoting must be possible without hindrance in particular during the belt webbing extension, it should be ensured by means of the special configuration and arrangement of the control clip in connection with the actuator that the control plate, which rotates together with the belt shaft with an incipient belt webbing extension, is first rotated by a specific angle of rotation relative to the control clip, which remains in place as a result of its frictionally engaging bearing, until the clip leg provided for fixing the inertial mass is located outside of the pivoting path of the inertial mass, so that the inertial mass can be freely pivoted out with corresponding rotating motions of the control plate. In this release position of the control clip, the clip leg comes to rest on the associated striking surface of the actuator and is taken along in this position during the further rotation of the control plate, so that the control clip retains its assumed release position on the control plate. With a subsequent rotation of the belt shaft with the control plate in the belt retracting direction occurs in turn a relative rotation of the control plate with respect to control clip, which is initially again stopped due to its frictionally engaged bearing, so that the inertial mass shifts outward with its pivot arm across the end of the appropriate clip leg with the rotation of the control plate, so that the clip leg can assume its function of fixing the inertial mass at the end of the retraction motion. In this again occupied blocking position of the control clip, the actuator abuts again with another contact surface against the other leg of the control clip, so that the control clip is respectively taken along in its blocking position with the rotation of the control plate and in this way retains its blocking position.

A contact surface for the clip leg provided for fixation of the inertial mass is configured on the pivot arm of the inertial mass according to an exemplary embodiment of the invention.

In order to ensure that the blocking position of the control clip is not only effective in an exact position of the appropriate leg with respect to the inertial mass, there is the provision according to an exemplary embodiment of the invention, that the clip leg provided for fixation of the inertial mass projects into the pivoting path by a predetermined angle of rotation transected by the inertial mass as a result of the relative rotation of the control plate bearing the inertial mass with respect to the fixed control clip and the contact surface configured on the inertial mass has an extension in peripheral direction that corresponds to the angle of rotation of the control plate established for fixation of the inertial mass. Since the object of the invention concerns the sudden stop of the rotating motion of the belt shaft at the end of its retraction motion, and thus a possible inertia-dependent further rotation of the control plate with respect to the belt shaft within the frame of the design of the coupling of the belt shaft and the control plate with respect to each other, the corresponding angle of rotation for fixation of the inertial mass against deflection by means of the clip leg needs only to correspond to this constructively fixed further rotation of the control plate.

The control clip with both legs is arranged in a plane located above the inertial mass and at a distance from the plane of the control plate and the free ends of the two legs have a section that is respectively bent in the direction of the plane of the control plate and the bent sections overlap the actuator and interact with its contact surfaces according to an exemplary embodiment of the invention. It is ensured, on the one hand, that the rotation of the control clip between its blocking position and its release position relative to the control plate is possible without impediment by means of the arrangement of the control clip within a plane arranged at a distance from the plane of the control plate and, on the other hand, a respectively flat contact on the inertial mass, on the one hand, and on the contact surfaces of the actuator, on the other hand, is ensured via the respectively bent section of both clip legs.

It is sufficient for the configuration of the blocking function of the control clip according to an exemplary embodiment of the invention if the bent section of the clip leg provided for fixation of the inertial mass remains at a distance from the contact surface of the inertial mass with the inertial mass in rest position.

As an alternative it can be provided that the bent section of the clip leg provided for fixation of the inertial mass rests on the contact surface of the inertial mass when the inertial mass is in the rest position. This is connected herewith to the additional advantage that the associated leg of the control clip also prevents at the same time any rattling noises in its blocking position by means of a fixation of the inertial mass.

The control clip can be configured as a bent wire part according to a first exemplary embodiment of the invention.

In an alternative embodiment of the invention it can be provided that the control clip is configured as a punched bent-part produced from a corresponding metal sheet. The control clip configured with a flat design is provided in this way with a reduced thickness but with the same strength when compared to a bent wire part and can basically be produced with a more accurate shape than the bent wire part.

In such an exemplary embodiment it can be provided that the end of the bent section of the clip leg provided for fixation of the inertial mass is configured in T-shape with attachments projecting laterally from the axis of the spring leg. A correspondingly good contact and guidance of the inertial mass, on the one hand, and the actuator, on the other hand, is realized in this way.

It can be provided herein that the bearing area of the control clip configured as a punched bent part is provided with a plastic coating, wherein the clip made of plastic and metal can be configured as one piece. The bearing area of the control clip can thereby also be optionally configured as a closed ring.

BRIEF DESCRIPTION OF THE INVENTION

Figure 2:
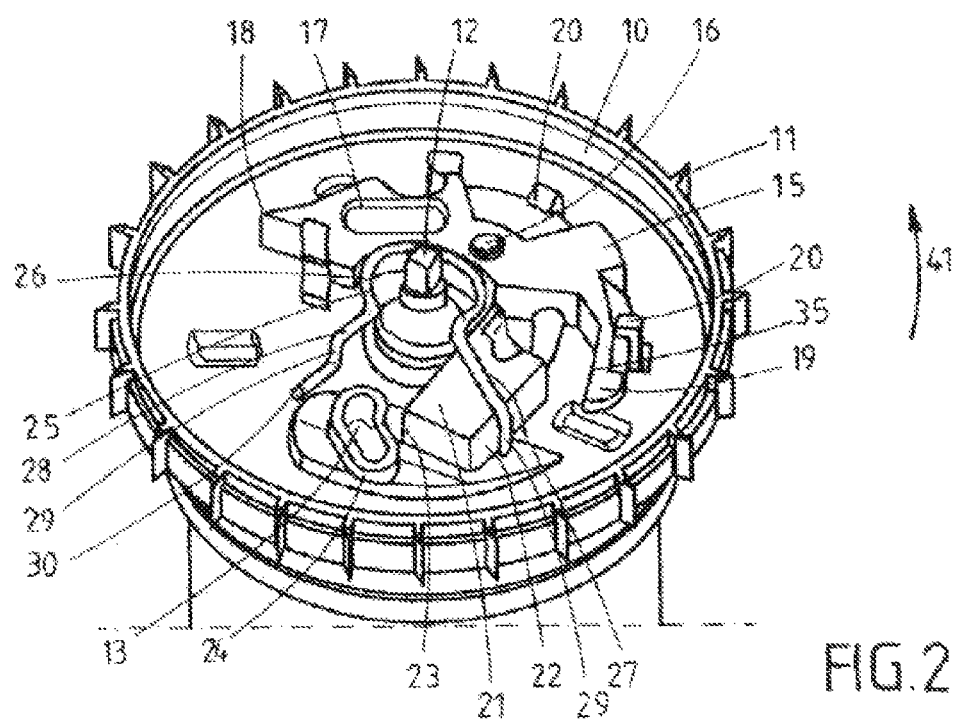

Exemplary embodiments of the invention, which will be described in the following, are depicted in the drawings. In the drawings:

FIG. 1 shows the control plate with the inertial mass pivotably arranged thereon in a schematic representation including the association of the control clip supported on a bearing plate (which is not depicted) and interacting with the inertial mass in the position of the control clip that is applicable for the belt retraction, FIG. 2 shows the control plate of FIG. 1 in the position of the control clip that is applicable for the belt extending direction of the belt shaft, FIG. 3 shows the control plate according to FIG. 1 with a control clip configured as a punched bent part in the position of control clip that is applicable for FIG. 1, FIG. 3a shows a detail of the drawing depicting the control clip configured as a punched bent part in a detail drawing, and FIG. 4 shows the control plate of FIG. 3 in the position of the control clip that is applicable for FIG. 2.

FURTHER DESCRIPTION OF THE INVENTION

The control plate 10 that can be seen in FIG. 1 is rotatably mounted on a shaft extension 12 and has an outer gearing 11 for coacting with a vehicle-sensitive control system. A slot 13, in which a pivot 14 depicted merely in FIGS. 1 to 4 and arranged on the locking element mounted on the belt shaft (which is not shown in further detail) is configured in the control plate 10. A two-armed inertial mass 15 is furthermore pivotably mounted on the control plate 10 by means of a pivot bearing 16 configured in its central area, wherein the two-armed inertial mass has a blocking arm 17 with an outer blocking tip 18 and a pivot arm 19. The inertial mass 15 is held on the control plate 10 by holding arms 20 mounted on the control plate 10 and correspondingly angled, so that the inertial mass 15 is fixed thereon in particular with its mutual rotation with the control plate 10. As is well known in the prior art and not shown in further detail, the pot-shaped recess of the control plate 10 in the assembly of the self-locking belt retractor is covered by a bearing plate of the belt retractor resting against it, wherein a corresponding bearing for the shaft extension 12 is configured in the bearing plate. The bearing plate is furthermore provided with a circulating blocking edge, which rises up and reaches into the pot-shaped recess of the control plate 10 and is provided with an inner gearing, so that the inertial mass 15, which is pivotably mounted on the control plate 10, hooks with the inner gearing of the bearing plate in its pivoted out blocking position, which is not shown in further detail in the drawing; the control plate 10 is stopped in this way in its further rotating motion. A relative rotation of the control plate 10 and the belt shaft and thus a displacement of a pivot (not shown) in the slot 13 occurs herewith with a further rotation of the belt shaft, which in turn leads to a pivoting out of the locking element into a blocking gearing configured on the belt retractor. The corresponding function of the self-locking belt retractor is also obtained from the generic EP 1 860 002 A1, but is especially described in detail in DE 103 24 125 B4 as well as in DE 29 24 575 A1 or DE 39 26 370 A1 and is therefore counted among the prior art.

A control clip 25 with Ω-shaped configuration in the form of a bent wire spring with a central bearing area 26 provided with a radius, is rotatably mounted on the bearing plate, which is not depicted, so that the control clip 25 can be rotated independently from the rotating motions of the control plate 10 around its bearing on the bearing plate relative to the control plate. The bearing of control clip 25 on the bearing plate can be carried out at the same time in a frictionally engaging manner in such a way that, on the one hand, the control clip 25 can rotate together with the control plate 10 and, on the other hand, however, also a functional phase is possible, in which the control clip 25 can remains standing with respect to a rotation of the control plate 10 and thus carries out a relative motion with respect to the control plate. The Ω-like control clip 25 has two spring legs 27, 28, which are at a distance from one another in peripheral direction, whose function will be described in the following.

An actuator 21 located between the two clip legs 27 and 28 is arranged on the control plate 10 in such a way that the actuator 21 configures contact surfaces 22 and 23 for the two legs 27 and 28 of the control clip 25, so that a stop of the actuator 21 interacts with the associated leg of the control clip 25 in each direction of rotation of the control plate 10 and the control clip 25 and thus takes the control clip 25 along in the respective direction of rotation of the control plate 10 in order to ensure that the control clip 25 can carry out the mutually rotating motions with the control plate 10 provided in the functional action of the belt retractor. The actuator 21 is specifically configured as a rectangular actuator block extending in peripheral direction of the control plate 10 between the spring legs 27 and 28 of the control clip 25, wherein an outer contact surface 22 is effective on an outer longitudinal side of the actuator block, while an inner contact surface 23 is formed by the corner of a short side with the longitudinal side of the rectangular actuator block located opposite to the contact surface 22. The locking element of the slot 13 is furthermore enclosed by a rising edge 24, which takes along the pivot for the purpose of a better guidance of the pivot that protrudes above the plane of the control plate 10.

The control clip 25 is arranged in such a way on the bearing plate that the control clip 25 with its two legs 27, 28 maintains a distance to the plane of the control plate 10, wherein the free ends of the two legs 27 and 28 have a respective section 29 bent in direction of the plane of the control plate 10, wherein the bent sections 29 of the spring legs 27 and 28 plunge in each case into the plane of the actuator 21 and the inertial mass 15 and interact with the aforementioned components, in order to ensure that the actuator 21, the rising edge 24 as well as also the inertial mass 15 arranged on the plane of the control plate 10 do not impede the provided relative rotation of the control clip 25 relative to the control plate 10, whose function is still to be described in detail.

As can be seen from the comparison of FIGS. 1 and 2, the right leg 27 of the control clip 25 is disposed for interaction with the pivot arm 19 of the inertial mass 5 in the representation according to FIGS. 1 and 2. The pivot arm 19 has for this purpose a contact surface 35 for the bent section 29 of the leg 27 on its inner side facing the spring leg 27 or its bent section 29, wherein in the position depicted in FIG. 1 and representing the control clip 25 with the rotation of the control plate 10 in the belt retracting direction (arrow 40) it rests on the contact surface 35 of the pivot arm 19 and can thus prevent an outward pivoting of the blocking arm 17.

As can be seen in FIG. 1, the leg 27 extends so far in direction of the pivot arm 19 of the inertial mass 15 that the bent section 29 rests on the contact surface 35. The inertial mass 15 is fixed therewith in its rest position during the rotating motions of the control plate 10, so that the inertial mass 15 is silenced. With the corresponding rotating motion of the belt shaft with the control plate 10 in retracting direction (arrow 40) the control clip 25 remains in the position that can be seen in FIG. 1, because it is taken along by means of the abutment of the inner contact surface 23 of the actuator 21 against the bent section 29 including a contact leg 30 of the leg 28 of the control clip 25, which projects radially at its end. This interaction prevents control clip 25 from extending into potentially binding contact between bent section 29 and the contact surface 35. If a sudden stop of the rotating motion of the belt shaft occurs at the end of the retracting motion, as described in the prior art according to DE 103 24 125 B4 as technical background, then an inertia-induced deflection of the inertial mass 15 in its engaged position with the bearing plate is ruled out by means of the abutment of the spring leg 27 of the control clip 25 against the contact surface 35 of the inertial mass 15.

If the belt shaft is now rotated with the control plate 10 as a result of a belt webbing extension in extending direction (arrow 41) on the basis of the arrangement of control plate 10 and control clip 25 depicted in FIG. 1 where the belt webbing is fully retracted on the belt shaft of the belt retractor, wherein the function of the belt webbing-sensitive control system is ensured during the rotation of the belt shaft in the belt extending direction and, as long as the inertial mass 15 must remain freely pivotable, then the control clip 25 remains on the bearing plate against the rotation of the control plate 10 as a result of its frictionally engaged bearing, so that it first completes a relative rotation of the control plate 10 with respect to the control clip 25 until the contact surface 35 of the pivot arm 19 of the inertial mass 15 has been released from the leg 27 of the control clip 25 and comes to rest on the outer contact surface 22 of the actuator block at the end of the relative rotation path of the control plate 10 to the control clip 25 of the bent section 29 of the leg 27, so that the control clip 25 is taken along in this spring position, which now makes possible the pivoting motion of the inertial mass 15, with the further rotating motions of the control plate 10 in belt extending direction (arrow 41).

If a switchover of the rotating motion of the belt shaft in belt retracting direction (arrow 40) takes place at the end of the belt extending motion, then it comes to a relative rotation of the control plate 10 against the control clip 25, which again remains fixed as a result of its frictionally engaged bearing, so that the contact surface 35 of the inertial mass 15 again shifts outward via the bent section 29 of the leg 27 and the control clip 25 is taken along in this position on the leg

28 of the control clip 25 by means of the stop of the inner contact surface 23 of the actuator 21.

The exemplary embodiment depicted in FIGS. 3, 3a and 4 differs from the exemplary embodiment that is described in detail in FIGS. 1 and 2 merely in that the control clip 25 is configured as a punched bent part, whereby this component exhibits a reduced material thickness when compared to a bent wire part with otherwise identical strength. As is not depicted in further detail, the central area 26 of the control clip 25 can be provided with a plastic coating; it is also possible to configure the central area 26 as a closed ring. A better abutment of the end of the leg on the associated components is provided insofar as the legs 27 and 28 have a flat shape in the configuration of the control clip 25 as a punched bent part. The end of the bent section 28 of the leg 27 provided for fixation of the inertial mass 15 is especially configured in T-shape with attachments 36 protruding laterally from the axis of the leg 27, which thus come to rest flatly on the contact surface 35 of the inertial mass 15 or the outer contact surface 22 of the actuator 21. Insofar as the leg 28 that interacts with the actuator 21 is likewise provided with a flat shape at its bent section 29, the leg 28 is now aligned in such a way with respect to the block-like actuator 21 that the bent section 29 of the leg 28 rests now as inner contact surface 23 against the inner longitudinal side of the actuator block 21.

The features of the object of these documents disclosed in the preceding description, the patent claims, the abstract and the drawings can be essential for the realization of the invention in its different embodiments, whether separately or in any desired combination with each other.

While the above description constitutes the preferred embodiment of the present invention, it will be appreciated that the invention is susceptible to modification, variation and change without departing from the proper scope and fair meaning of the accompanying claims.

The invention claimed is:

1. A self-locking belt retractor for seat belts of a type having a belt shaft rotatably mounted in a housing frame and tensioned by means of a retraction spring in the retracting direction of a belt webbing and having a belt webbing-sensitive actuation mechanism, which has a control plate coupled to the belt shaft for deflecting a locking element coupled to the belt shaft that can be deflected with a relative rotation between the belt shaft and the control plate until the locking element engages with the housing frame, wherein the control plate bears an inertial mass having a blocking arm and a pivot arm, which is eccentrically pivotably mounted on the control plate and can be radially deflected against the action of a reset spring, and which, in case of radial deflection as a result of an angular acceleration acting on the control plate, radially pivots with the blocking arm engaging in a fixed gearing and thereby rotationally fixes the control plate, and comprising, a control clip having a central bearing area and a first leg and a second leg arranged at a distance from each other in a peripheral direction, wherein the first leg has an inner surface and the second leg has an inner surface, and the inner surfaces of the first leg and the second leg oppose each other, the control clip rotatably mounted on a bearing surface relative to the control plate by means of the bearing area and rotationally moveable between an abutting position on the inertial mass and an abutting position on an actuator formed by the control plate, wherein one of the first leg or the second leg moves between an abutting position on the inertial mass and an abutting position on the actuator, the first and second legs of the control clip enclose the actuator between the respective inner surfaces of the first and second legs that oppose each other and the actuator forms at least one actuator contact surface for the first and second legs for taking along the control clip during the rotation of the control plate in a belt retracting direction as well as in a belt extending direction, wherein the first leg projects during rotation of the control plate in the belt retracting direction into the pivoting path of the pivot arm of the inertial mass and prevents a pivoting out of the inertial mass in a blocked position of the control clip and releases the inertial mass with a rotation of the control plate in the belt extending direction as a result of a relative rotation of the control clip with respect to the control plate in a release position of the control clip.

2. The self-locking belt retractor according to claim 1, further comprising in that an inertial mass contact surface for the first leg provided for fixation of the inertial mass is configured on the pivot arm of the inertial mass.

3. The self-locking belt retractor according to claim 2 further comprising in that the first leg provided for fixation of the inertial mass projects into the pivoting path by a predetermined angle of rotation transected by the inertial mass as a result of the relative rotation of the control plate bearing the inertial mass with respect to the fixed control clip and the contact surface configured on the inertial mass has an extension in peripheral direction that corresponds to the predetermined angle of rotation of the control plate established for fixation of the inertial mass.

4. The self-locking belt retractor according to claim 1 further comprising in that the control clip central bearing area is arranged in a plane arranged above the inertial mass and at a distance from the plane of the control plate and free ends of the first and second legs each have a bent section that is respectively bent in the direction of the plane of the control plate and the bent sections coact with the at least one contact surface of the actuator.

5. The self-locking belt retractor according to claim 4, further comprising in that the bent section of the first leg provided for fixation of the inertial mass remains at a distance from the contact surface of the inertial mass with the inertial mass in a rest position.

6. The self-locking belt retractor according to claim 4 further comprising in that the bent section of the first leg provided for fixation of the inertial mass rests on the contact surface of the inertial mass with the inertial mass in a rest position.

7. The self-locking belt retractor according to claim 1 further comprising in that the control clip is configured as a bent wire part.

8. The self-locking belt retractor according to claim 7 wherein the bent wire part is formed from a single piece of wire forming the central bearing area with the first and second legs extending therefrom.

9. The self-locking belt retractor according to claim 1 further comprising in that the control clip is configured as a punched metal part.

10. The self-locking belt retractor according to claim 9, further comprising in that the end of a bent section of the first leg provided for fixation of the inertial mass is configured in T-shape with portions projecting laterally from the axis of the first leg.

11. The self-locking belt retractor according to claim 9 further comprising in that the bearing area of the control clip is configured as punched bent part provided with a plastic coating.

12. The self-locking belt retractor according to claim 1 further comprising wherein the second leg of the control clip interacts with the actuator to limit movement of the first leg into engagement with the inertial mass.

13. The self-locking belt retractor according to claim 1 wherein the actuator is an integral part of the control plate.

14. The self-locking belt retractor according to claim 1, wherein the actuator includes a first contact surface and a second contact surface, wherein the first leg rotates to contact the first contact surface and the second leg rotates to contact the second contact surface.

15. A self-locking belt retractor for seat belts of a type having a belt shaft rotatably mounted in a housing frame and tensioned by means of a retraction spring in the retracting direction of a belt webbing and having a belt webbing-sensitive actuation mechanism, which has a control plate coupled to the belt shaft for deflecting a locking element coupled to the belt shaft that can be deflected with a relative rotation between the belt shaft and the control plate until the locking element engages with the housing frame, wherein the control plate bears an inertial mass having a blocking arm and a pivot arm, which is eccentrically pivotably mounted on the control plate and can be radially deflected against the action of a reset spring, and which, in case of radial deflection as a result of an angular acceleration acting on the control plate, radially pivots with the blocking arm engaging in a fixed gearing and thereby rotationally fixes the control plate, and comprising, a control clip having a central bearing area and a first leg and a second leg arranged at a distance from each other in a peripheral direction, the control clip rotatably mounted on a bearing surface relative to the control plate by means of the bearing area and rotationally moveable between an abutting position on the inertial mass and an abutting position on an actuator formed by the control plate, the first and second legs of the control clip enclose the actuator between them and the actuator forms at least one actuator contact surface for the first and second legs for taking along the control clip during the rotation of the control plate in a belt retracting direction as well as in a belt extending direction, wherein the first leg projects during rotation of the control plate in the belt retracting direction into the pivoting path of the pivot arm of the inertial mass and prevents a pivoting out of the inertial mass in a blocked position of the control clip and releases the inertial mass with a rotation of the control plate in the belt extending direction as a result of a relative rotation of the control clip with respect to the control plate in a release position of the control clip;

wherein the first and second legs of the control clip are arranged at an acute angle, and the first leg includes a first inner surface and the second leg includes a second inner surface, wherein the first and second inner surfaces face each other, wherein the actuator includes a first outer contact surface and a second outer contact surface, wherein both the first and second outer contact surfaces of the actuator are disposed between the first and second inner surfaces of the control clip, where the first outer contact surface faces the first inner surface of the first leg, and the second outer contact surface faces the second inner surface of the second leg, wherein, when the first leg rotates in a first rotational direction the first inner surface of the first leg will contact the first outer contact surface and, when the second leg rotates in a second rotational direction that is opposite the first rotational direction the second inner surface of the second leg will contact the second outer contact surface.

16. The self-locking belt retractor according to claim 15, wherein the first leg moves between an abutting position on the inertial mass and an abutting position on the actuator.

\* \* \* \* \*